US007723608B2

(12) United States Patent
Higashikozono et al.

(10) Patent No.: US 7,723,608 B2
(45) Date of Patent: May 25, 2010

(54) TERMINAL BOX FOR A SOLAR BATTERY MODULE, A RECTIFYING-DEVICE UNIT AND A METHOD OF ASSEMBLING IT

(75) Inventors: Makoto Higashikozono, Yokkaichi (JP); Hiroyuki Yoshikawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 1004 days.

(21) Appl. No.: 11/108,371

(22) Filed: Apr. 18, 2005

(65) Prior Publication Data

US 2005/0230140 A1    Oct. 20, 2005

(30) Foreign Application Priority Data

Apr. 19, 2004    (JP)    ............................. 2004-122884

(51) Int. Cl.
*H01L 31/042*    (2006.01)
(52) U.S. Cl. ........................... 136/244; 323/299; 174/50
(58) Field of Classification Search .................. 323/299; 174/50
See application file for complete search history.

(56) References Cited

U.S. PATENT DOCUMENTS 6,828,503 B2    12/2004    Yoshikawa et al.
2002/0117200 A1*    8/2002    Yoshikawa et al. .......... 136/256
2003/0193322 A1*    10/2003    Higashikozono et al. .... 323/299
2005/0127890 A1*    6/2005    Swenson et al. ............. 324/72

FOREIGN PATENT DOCUMENTS

JP    2002-057360    2/2002
JP    2002359389 A * 12/2002
JP    3498945    2/2004

OTHER PUBLICATIONS

Machine translation of JP2002359389A, published Dec. 13, 2002.*

* cited by examiner

*Primary Examiner*—Alexa D Neckel
*Assistant Examiner*—Xiuyu Tai
(74) *Attorney, Agent, or Firm*—Gerald E. Hespos; Michael J. Porco

(57) ABSTRACT

A terminal box for a solar battery module is provided with terminal plates (30) connectable with positive and negative electrodes of the solar battery module, cables (91) for external connection connectable with the terminal plates (30), bypass diodes (50) spanning between the adjacent terminal plates (30), and a pair of lead pieces (80) each connected with a corresponding pair of conductor plates (51) provided in the bypass diode (50) and holding a bear chip diode therebetween. The leading ends of horizontal portions (83) of the lead pieces (80) are detachably connected with the corresponding terminal plates (30) by bolts (24).

10 Claims, 5 Drawing Sheets

TERMINAL BOX FOR A SOLAR BATTERY MODULE, A RECTIFYING-DEVICE UNIT AND A METHOD OF ASSEMBLING IT

BACKGROUND OF THE INVENTION

1. Field of the Invention

The invention relates to a terminal box for a solar battery module, to a rectifying unit and to a method of assembling it.

2. Description of the Related Art

A solar energy generation system supplies direct-current electricity from a solar battery panel on the roof of a house to electric equipment via an inverter or the like. The solar battery panel has solar battery modules, and electrodes of the solar battery modules are connected via terminal boxes.

Japanese Patent Publication No. 3498945 discloses a terminal box with terminal plates juxtaposed in a box. Ends of the terminal plates at one side are connectable with positive and negative electrodes drawn out from the underside of the solar battery module and the other ends thereof are connectable with cables for external connection. Bear chip diodes span between adjacent terminal plates and short an inverse current if there is an inverse load from one cable for external connection to the other. The bear chip diode has a diode functioning portion and two conductor pieces connect with the diode functioning portion while hold the diode functioning portion therebetween. The conductor pieces also are connected with the corresponding terminal plates by soldering. The bear chip diode is inexpensive and takes up a smaller area in the box as compared to a diode of the package type.

Excessive current caused, for example, by lightening may break the bear chip diode. The broken bear chip diode cannot be replaced easily since the conductor pieces of the bear chip diode are soldered to the terminal plates.

The present invention was developed in view of the above problem and an object thereof is to make a rectifying device easily exchangeable.

SUMMARY OF THE INVENTION

The invention relates to a terminal box for a solar battery module. The terminal box includes a box main body and terminal plates are in the box main body for connection with positive and negative electrodes of the solar battery module. Cables are provided for external connection with the terminal plates. At least one rectifying device spans between two corresponding terminal plates. The rectifying device includes a rectifying-device main body and two lead pieces. The lead pieces are connected detachably with the respective terminal plates. The at least one rectifying device is provided for bypass at the time of an inverse load.

The lead pieces may be connected directly with the rectifying-device main body by holding the rectifying-device main body therebetween or are connected indirectly with the rectifying-device main body via two conductor plates that hold the rectifying-device main body therebetween.

The rectifying device may include a chip-shaped rectifying-device main body.

The lead pieces in the rectifying device are detachably connectable with the corresponding terminal plates. Thus, the lead pieces of a broken rectifying device can be detached from the terminal plates and lead pieces of a new rectifying device can be mounted to the terminal plates when the rectifying device is broken. Thus, the rectifying device can be exchanged easily.

The lead pieces preferably are attached to the corresponding terminal plates by threaded bolts. Thus, a simple operation of screwing the bolts is sufficient for exchanging the rectifying device. Further, the lead pieces and the terminal plates can be threadedly connected.

A rectifying-device unit preferably is detachably mountable into the box main body. The rectifying-device unit accommodates the rectifying device in a casing that is sealed except for connection areas of the lead pieces with the corresponding terminal plates. Thus, the rectifying device is handled integrally as the rectifying-device unit and is mounted easily into the box main body.

The invention also relates to a rectifying-device unit with a rectifying device for bypass at the time of an inverse load. The rectifying device spans between two terminal plates juxtaposed in a box main body. The terminal plates are connectable with positive and negative electrodes of a solar battery module and connectable with cables for external connection. Two lead pieces are provided in the rectifying device. The lead pieces are connected directly with a rectifying-device main body by holding the rectifying-device main body therebetween or are connected indirectly with the rectifying-device main body via a pair of conductor plates that hold the rectifying-device main body therebetween. The lead pieces also are detachably connectable with the two terminal plates. A casing is provided for accommodating the rectifying device in a sealed state except connection areas of the lead pieces with the terminal plates. The casing is detachably mountable in a box main body.

DETAILED DESCRIPTION OF THE PREFERRED EMBODIMENTS

Figure 1:
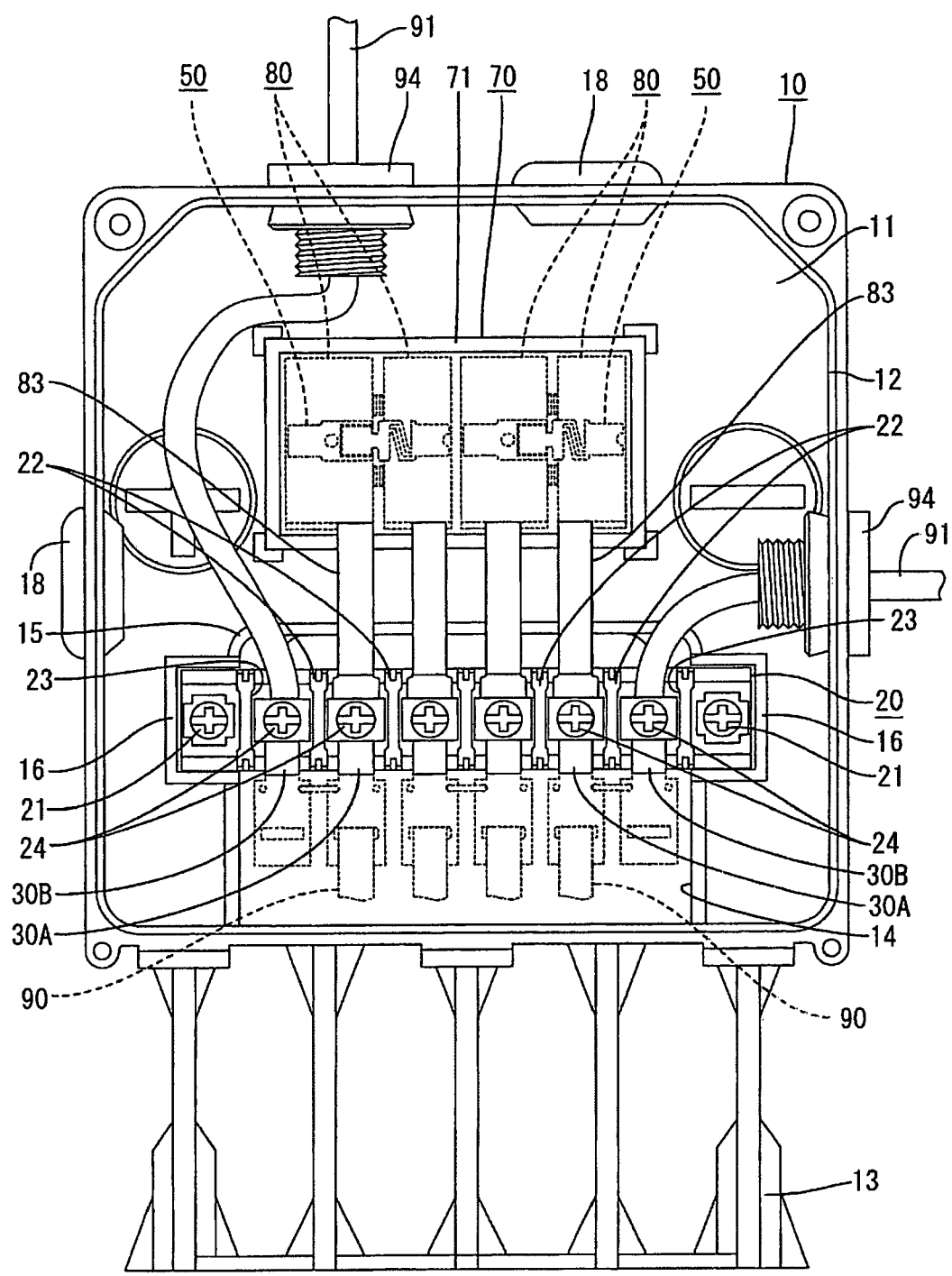
FIG. 1 is a plan view of a terminal box for a solar battery module according to one embodiment of the invention.

A terminal box for a solar battery module according to the invention is mountable on the underside of a solar battery module (not shown). The solar battery module has a multitude of solar battery cells connected in series and arranged on the outer surface thereof. The terminal box has a box main body identified by the numeral 10 in FIGS. 1 to 5. Terminal plates 30 are juxtaposed in the box main body 10, and bypass diodes are provided for reverse current flow. The bypass diodes 50 are constructed into a rectifying-device unit 70 accommodated in a casing 71, and the rectifying-device unit 70 is mounted detachably in the box main body 10.

The box main body 10 is made e.g. of a synthetic resin and has a substantially rectangular base plate 11, as shown in FIG. 1. A side plate 12 projects up from the outer peripheral edge of the base plate 11. A mounting portion 13 projects out from one end of the side plate 12 to mount the terminal box on the solar battery module. The box main body 10 has an open top and a cover (not shown) is mounted from above after the terminal plates 30 are assembled therein. A substantially rectangular opening 14 is formed at one end of the base plate 11, and leads 90 connected with positive and negative electrodes of the solar battery module are introduced through the opening 14.

The base plate 11 has a bank wall 15 standing up along the edge of the opening 14, and two positioning walls 16 bulge out sideways at substantially opposite ends of the bank wall 15. The positioning walls 16 are substantially L- or U-shaped, and the openings thereof are substantially opposed to each other. A terminal mount 20 is mounted on the base plate 11 and crosses the opening 14 with the opposite ends of the terminal mount 20 positioned by the corresponding positioning walls 16.

The terminal mount 20 is a narrow rectangular bar made of a synthetic resin. Fixing screws 21 are engageable with the opposite ends of the terminal mount 20. Partition walls 22 project substantially along the longitudinal direction at specified intervals on the upper surface of the terminal mount 20. Terminal accommodating recesses 23 are formed between the adjacent partition walls 22, and the terminal plates 30 are secured to the bottom surfaces of the terminal accommodating recesses 23 by metal bolts 24.

Figure 3:
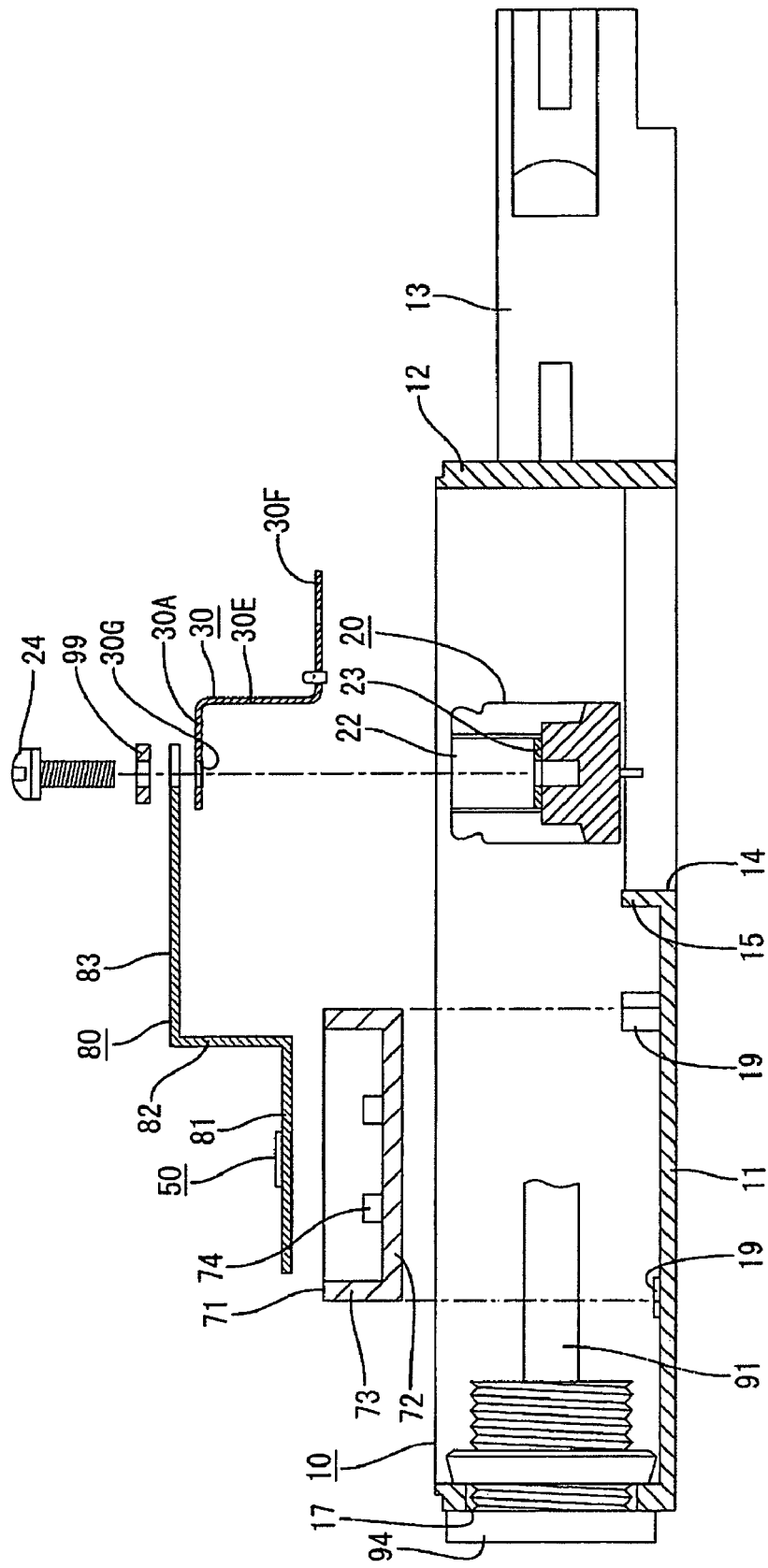
FIG. 3 is an exploded section of the respective parts before sealing.

The terminal plates 30 have a substantially identical shape and a substantially identical size. As shown in FIGS. 1 and 3, each terminal plate 30 has a device-side or a cable-side connection 30A, 30B formed with an insertion hole 30G for the bolt 24 and is placed substantially along the bottom surface of the terminal accommodating recess 23. A coupling 30E extends down from one end of the connection 30A, 30B substantially along the standing wall surface of the terminal mount 20. A battery-side connection 30F widens and projects from the bottom end of the coupling 30E and extends along a plane of the opening 14 in a direction away from the terminal mount 20. The corresponding lead 90 introduced from the underside of the opening 14 is connected electrically with the battery-side connection 30F of the terminal plate 30 by soldering, welding, press-fitting or the like. Insulating resin R is filled inside the bank wall 15 to seal connecting parts of the leads 90 and the battery-side connections 30F.

The terminal accommodating recesses 23 at the opposite ends of the terminal mount 20 have the cable-side connection 30B inserted from one side while the leading end of a cable 91 for external connection is inserted from the other side. The bolt 24 connects the cable 91 and the cable-side connecting portion 30B electrically. Cable insertion holes 17 are formed at the left and right sides of the side plate 12 and at two positions at the other end of the side plate 12. The cables 91 are introduced through two of these cable insertion holes 17, and blind bushes 18 are fit into the remaining two cable insertion holes 17, thereby closing the cable insertion holes 17. Connector portions (not shown) are connected with extending ends of the cables 91.

Figure 2:
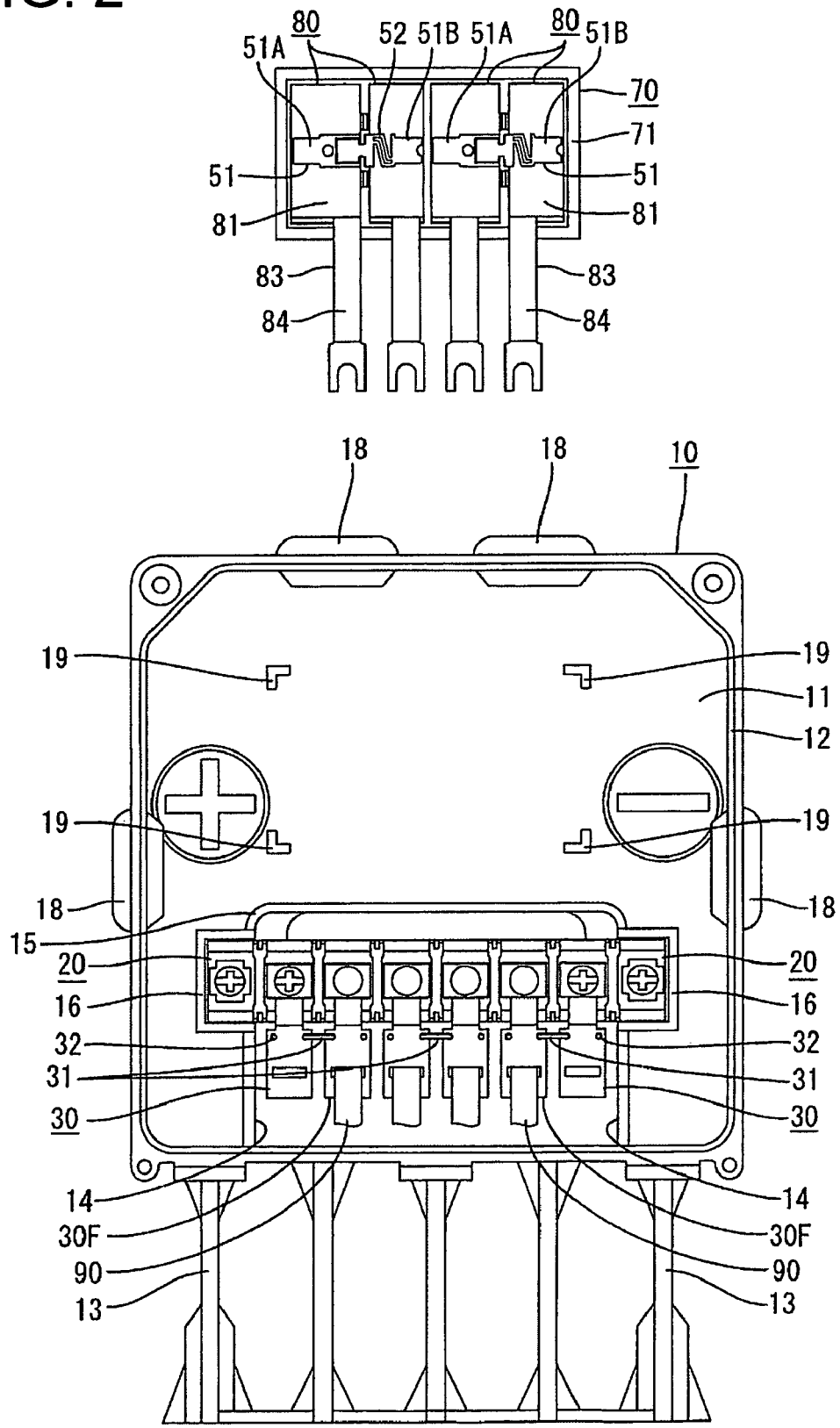
FIG. 2 is an exploded plan view of a rectifying-device unit and a box main body before sealing.

The device-side connections 30A are inserted from one side of the four terminal accommodating recesses 23 in the middle of the terminal mount 20 and the leading end of a lead piece 80 extending from the rectifying-device unit 70 is inserted from the other side. Thus, the bolt 24 electrically connects the lead piece 80 and the device-side connection 30A. Further, as shown in FIG. 2, a jumper pin 31 spans between each pair of the adjacent terminal plates 30 to connect the respective terminal plates 30 electrically with each other. Engaging holes 32 are formed at the opposite ends of each battery-side connection 30F for receiving the leading end of the jumper pin 31.

The rectifying-device unit 70 is comprised of two side-by-side bypass diodes 50, lead pieces 80 and the casing 71. The lead pieces 80 are provided in conformity with the respective bypass diodes 50, and the casing 71 accommodates the bypass diodes 50 in a sealed manner. The rectifying-device unit 70 is mounted to the base plate 11 to face the bank wall 15.

Figure 4:
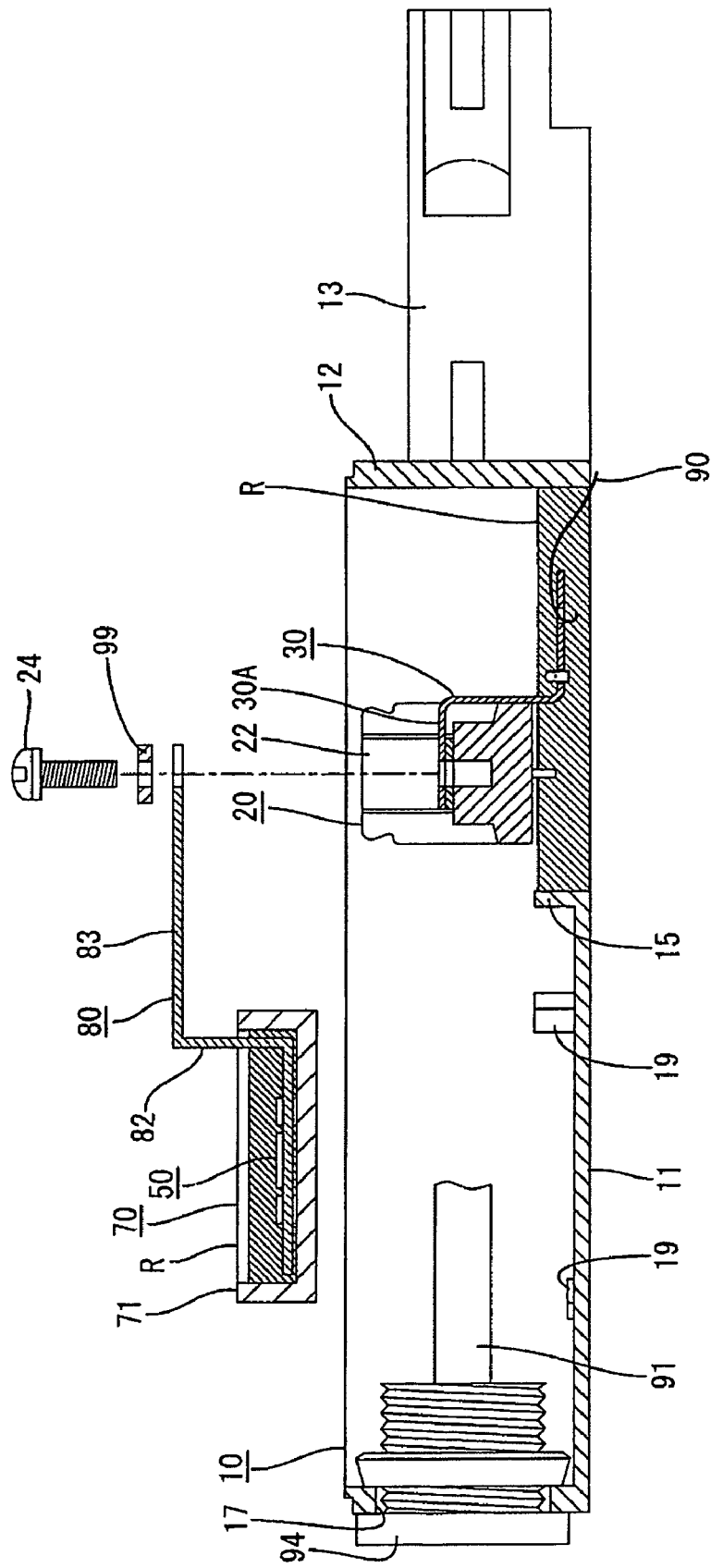
FIG. 4 is an exploded section of the rectifying-device unit and the box main body.

The casing 71 is made e.g. of a synthetic resin and defines a box with an open upper surface. The casing 71 can be placed on the base plate 11 with the four corners positioned by corner receiving projections 19 of the base plate 11. More specifically, as shown in FIGS. 2 to 4, the casing 71 has a substantially rectangular bottom plate 72 and a surrounding plate 73 projecting up from the outer periphery of the bottom plate 72 and at least partly surrounding the bottom plate 72. The projecting distance of the surrounding plate 73 is less than about half, most preferably about one third of that of the side plate 12. Lead pieces 80 mounted to the bottom plate 72 of the casing 71 define tiny clearances therebetween, and locks 74 project at positions corresponding to the clearances for positioning the lead pieces 80.

The insulating resin R is filled only into the casing 71 and the inside of the bank wall 15 to seal the connected parts of the lead pieces 80 and the bypass diodes 50. Thus, unlike the prior art, the bank wall 15 and the casing 71 receive the insulating resin R in the box main body 10, and it is not necessary to fill the insulating resin R in the entire box main body. Therefore, the amount of the insulating resin R can be reduced to suppress the raw material costs.

Each bypass diode 50 is comprised of a mesa bear or surface etched chip diode and two conductor plates 51 connected with the bear chip diode by soldering, (ultrasonic) welding or the like, while sandwiching the bear chip diode from opposite sides along the thickness direction. The conductor plates 51 include an N-conductor plate 51A that is connectable with an N-area of the bear chip diode and a P-conductor plate 51B that is connectable with a P-area of the bear chip diode. The N-conductor plate 51A and the P-conductor plate 51B extend in substantially opposite directions from a contact with the bear chip diode. A bore is formed in an intermediate section of the P-conductor plate 51B along the extending direction of the P-conductor plate 51B. Narrow strips 52 are formed as the bore is made. Thus, the P-conductor plate 51B absorbs a stress created e.g. during the welding to the lead piece 80.

The lead piece 80 has two electrically conductive metal plates that extend substantially normal to the extending direction of the conductor plates 51 and are connectable respectively with the P-conductor plate 51B and the N-conductor plate 51A. The lead piece 80 has a wide contact 81 arranged on the upper surface of the bottom plate 72 of the casing 71 for electrical connection with the corresponding conductor plate 51 by solder welding, resistance welding or ultrasonic welding. A narrow vertical portion 82 extends from one end of the contact 81 and stands along the inner side surface of the surrounding plate 73. Finally, a horizontal portion 83 extends substantially horizontally out of the casing 71 from the upper end of the vertical portion 82 and has an extending end facing the corresponding terminal accommodating recess 23.

The horizontal portion 83 and the vertical portion 82 have substantially the substantially same width over the entire length, and the horizontal portion 83 is aligned with the device-side connecting portion 30A of the terminal plate 30 when viewed from above during the connecting operation. The upper end of the vertical portion 82 is higher than the upper end of the surrounding plate 73 of the casing 71 and slightly higher than the bottom surface of the terminal accommodating recess 23. A substantially U-shaped cut is formed at the extending end of the horizontal portion 83, and the bolt 24 is inserted into this U-shaped cut to connect the horizontal portion 83 with the device-side connecting portion 30A of the corresponding terminal plate 30. Further, an insulating tube 84 covers the horizontal portion 83 over substantially the entire length.

As shown in FIG. 2, opposite ends of the terminal mount 20 are fit in the spaces inside the positioning walls 16. Fixing screws 21 then fix the terminal mount 20 to the base plate 11. The device-side and cable-side connections 30A, 30B of the terminal plates 30 then are placed on the bottom surfaces of the corresponding terminal accommodating recesses 23, and the pairs of the terminal plates 30 are coupled electrically by the jumper pins 31. The leading end of each cable 91 is inserted through the corresponding cable insertion hole 17 of the box main body 10 and is placed on the cable-side connecting portion 30B of the terminal plate 30 in the corresponding terminal accommodating recess 23. The bolt 24 then is screwed down so that the head of the bolt 24 presses the leading end of the cable 91 and the cable-side connecting portion 30B against the terminal mount 20 for connection. A cable clamp 94 fit between the cable 91 and the cable insertion hole 17 holds each cable 91 hermetically.

The box main body 10 then is secured to the underside of the solar battery module via the mounting portion 13 by an adhesive double-coated tape or the bolts 24. In the mounting process, the leads 90 connected with the electrodes of the solar battery module are inserted into the box main body 10 through the opening 14, and are connected with the battery-side connecting portions 30F of the terminal plates 30 by soldering, ultrasonic welding, press-fitting, insulation coating displacement or the like. The insulating resin R, such as a silicone resin, then is filled inside the bank wall 15 to seal the connected parts of the battery-side connections 30F and the leads 90 hermetically.

The rectifying-device unit 70 is produced by positioning the contacts 81 of the lead pieces 80 on the bottom surface of the casing 71. The conductor plates 51 of the bypass diodes 50 then are connected with the contacts 81 by ultrasonic welding, soldering, press-contact or the like. Insulating resin R then is filled into the casing 71 to seal the connected parts of the contacts 81 and the conductor plates 51 hermetically and to complete the rectifying-device unit 70.

Figure 5:
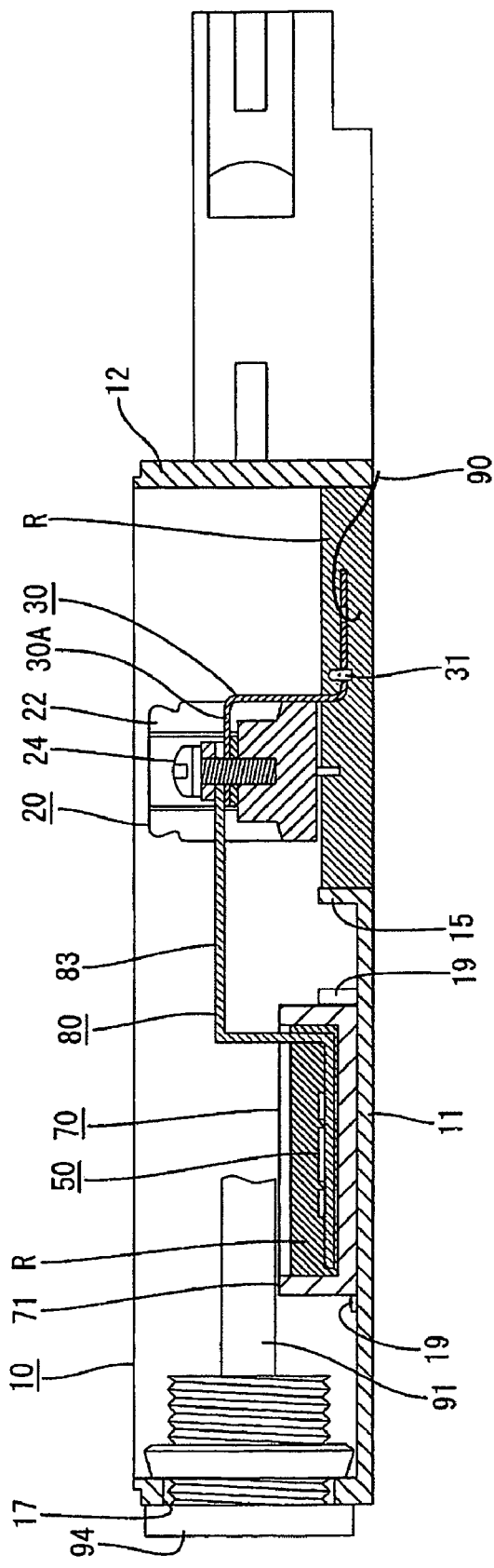
FIG. 5 is a section of the substantially completed terminal box.

The leading ends of the horizontal portions 83 of the lead pieces 80 project out of the casing 71 in the rectifying-device unit 70 and are placed on the device-side connections 30A of the terminal plates 30 in the corresponding terminal accommodating recesses 23. The bolts 24 then are screwed down with washers, spring washers or O-rings 99 held between the heads of the bolts 24 and the leading ends of the horizontal portions 83. Thus, the heads of the bolts 24 press the leading ends of the horizontal portions 83 and the device-side connections 30A against the terminal mount 20, as shown in FIGS. 4 and 5. In the meantime, the four corners of the casing 71 are fit in the corner receiving portions 19 of the base plate 11 to position the entire rectifying-device unit 70. The rectifying-device unit 70 then is fixed to the base plate 11. The insulating resin R is filled in the bank wall 15 and the casing 71 after the rectifying-device unit 70 is mounted. The cover then is mounted on the box main body 10 from above for sealing.

The bypass diode 50 may be broken or enter a non-conductive state by a current surge current flows or an external force. In such a case, it may be necessary to exchange the broken bypass diode 50 for a new bypass diode 50 that operates properly. The cover then is opened and the bolts 24 used to connect the lead pieces 80 and the device-side connections 30A of the terminal plates 30 are loosened and detached. The rectifying-device unit 70 then is lifted up and detached from the base plate 11. The rectifying-device unit 70 that accommodates the new bypass diode 50 is mounted on the base plate 11.

As described above, it is possible to detach the lead piece 80 of the broken bypass diode 50 from the terminal plate 30 and to mount the lead piece 80 of the new bypass diode 50 on the terminal plate 30 when the bypass diode 50 is broken by a surge current or the like. Thus, an exchange can be made more easily than in the prior art.

The lead piece 80 is secured to the corresponding terminal plate 30 by the bolt 24. Thus, a simple operation of inserting the bolt 24 is sufficient to exchange the bypass diode 50. Further, the lead piece 80 and the terminal plate 30 can be connected more securely by the bolt.

The rectifying-device unit 70 has the casing 71 for accommodating the bypass diodes 50 in a sealed state except that the distal portions 83 are formed into a module. Thus, only the connected parts of the lead pieces 80 and the conductor plates 51 are sealed. Further, since the rectifying-device unit 70 can be handled unitarily, the box main body 10 is mounted more easily.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

The lead pieces connect electrically with the bear chip diodes via the conductor plates in the foregoing embodiments. However, the lead pieces may directly hold the bear chip diodes therebetween without the conductor plates according to the present invention.

Two bypass diodes are accommodated in the casing in the foregoing embodiment. However, one bypass diode may be accommodated in the casing or three or more bypass diodes may be accommodated in the casing.

Although the casing is resin-sealed in the foregoing embodiment, it may be sealed, for example, by a lid according to the present invention.

Although the bypass diodes are accommodated in the casing to form a module as the rectifying-device unit in the foregoing embodiment, the bypass diodes need not be accommodated in the casing.

What is claimed is:

1. A terminal box for a solar battery module, comprising:
a box main body including a base plate and a side plate projecting up from an outer peripheral edge of the base plate, receiving projections projecting from the base plate at positions inwardly of the side plate,
a plurality of terminal plates in the box main body and connectable with positive and negative electrodes of the solar battery module,
cables for external connection connectable with the terminal plates,
a rectifying-device casing detachably mounted in the box main body between the receiving projections of the base plate,
at least one rectifying device for spanning between two corresponding terminal plates,
wherein the rectifying device includes a rectifying-device main body and a pair of lead pieces, each of the lead pieces having a contact connected to the rectifying device main body, the rectifying-device main body and the contacts of the lead pieces being disposed in the rectifying-device casing, each of the lead pieces further having an extending end disposed externally of the rectifying-device casing and disposed adjacent the respective terminal plates; and a threaded connection member detachably connecting the extending ends of the lead pieces with the respective two terminal plates, wherein, upon exchanging a broken rectifying device, the rectifying device is removed by detaching the extending ends of the lead pieces from the respective two terminal plates and lifting the rectifying-device casing from the receiving projections of the base plate.

2. The terminal box of claim 1, wherein the at least one rectifying device is provided for bypass at the time of an inverse load.

3. The terminal box of claim 1, wherein the lead pieces are directly connectable with the rectifying-device main body by holding the rectifying-device main body therebetween.

4. The terminal box of claim 1, wherein the lead pieces are indirectly connectable with the rectifying-device main body via a pair of conductor plates holding the rectifying-device main body therebetween.

5. The terminal box of claim 1, wherein the threaded connection members are bolts.

6. The terminal box of claim 1, further comprising a rectifying-device sealant in the casing for accommodating the rectifying device in the casing in a sealed state except the connection areas of the lead pieces.

7. The terminal box of claim 1, wherein the lead pieces are directly connectable with the rectifying-device main body by holding the rectifying-device main body therebetween.

8. The terminal box of claim 1, wherein the lead pieces are indirectly connectable with the rectifying-device main body via a pair of conductor plates holding the rectifying-device main body therebetween.

9. The terminal box of claim 1, wherein the rectifying-device casing is substantially rectangular and wherein the box main body has four receiving projections engaging spaced apart positions on the rectifying-device casing.

10. The terminal box of claim 9, wherein the rectifying-device casing has four corners, the receiving projections being substantially L-shaped and engaging the corners of rectifying-device casing.

* * * * *